United States Patent
Williams et al.

(10) Patent No.: US 10,637,881 B2
(45) Date of Patent: Apr. 28, 2020

(54) JAVASCRIPT SECURITY TESTING

(71) Applicant: EntIT Software LLC, Sunnyvale, CA (US)

(72) Inventors: Kevin Allen Williams, Alpharetta, GA (US); Brian Charles King, Alpharetta, GA (US); Steve Alan Millar, Dawsonville, GA (US)

(73) Assignee: MICRO FOCUS LLC, Santa Clara, CA (US)

( * ) Notice: Subject to any disclaimer, the term of this patent is extended or adjusted under 35 U.S.C. 154(b) by 132 days.

(21) Appl. No.: 15/678,451

(22) Filed: Aug. 16, 2017

(65) Prior Publication Data

US 2018/0063180 A1    Mar. 1, 2018

Related U.S. Application Data

(60) Provisional application No. 62/380,178, filed on Aug. 26, 2016.

(51) Int. Cl.
| | |
|---|---|
| *H04L 29/06* | (2006.01) |
| *G06F 8/41* | (2018.01) |
| *G06F 8/35* | (2018.01) |
| *G06F 21/56* | (2013.01) |

(52) U.S. Cl.
CPC ............ *H04L 63/1433* (2013.01); *G06F 8/35* (2013.01); *G06F 8/41* (2013.01); *G06F 21/566* (2013.01)

(58) Field of Classification Search
CPC ......... H01L 63/1433; G06F 8/35; G06F 8/41; G06F 21/566
See application file for complete search history.

(56) References Cited

U.S. PATENT DOCUMENTS

| | | | |
|---|---|---|---|
| 8,516,590 B1* | 8/2013 | Ranadive | H04L 63/1433 713/187 |
| 8,752,183 B1* | 6/2014 | Heiderich | G06F 21/577 726/22 |
| 9,015,844 B1 | 4/2015 | Franklin | |
| 9,160,762 B2 | 10/2015 | Brake et al. | |
| 9,578,048 B1* | 2/2017 | Hunt | H04L 63/1483 |
| 2005/0289452 A1* | 12/2005 | Kashi | G06F 17/2247 715/232 |
| 2006/0253508 A1* | 11/2006 | Colton | G06F 8/52 |
| 2009/0187918 A1* | 7/2009 | Chen | G06F 21/52 719/313 |
| 2010/0088668 A1 | 4/2010 | Yoshihama | |

(Continued)

OTHER PUBLICATIONS

Monga, M., et al., A Hybrid Analysis Framework for Detecting Web Application Vulnerabilities, Universita degli Studi di Milano, May 19, 2009, 8 pages.

(Continued)

*Primary Examiner* — Techane Gergiso

(57) ABSTRACT

In one example in accordance with the present disclosure, a method may include receiving an initial document object model (DOM) corresponding to an HTML page structure including a plurality of executable JavaScript code and simulating user interaction with an executable JavaScript code belonging to the plurality in the HTML page structure. The method may include adjusting the initial DOM based on the simulated user interaction, generating byte code corresponding to the adjust DOM and analyzing the byte code using a set of static rules.

17 Claims, 5 Drawing Sheets

(56) References Cited

U.S. PATENT DOCUMENTS

| | | | |
|---|---|---|---|
| 2010/0198799 A1* | 8/2010 | Krishnan | G06F 11/3696 |
| | | | 707/702 |
| 2012/0173966 A1* | 7/2012 | Powell | G06Q 30/0241 |
| | | | 715/234 |
| 2012/0198558 A1 | 8/2012 | Liu | |
| 2013/0111595 A1* | 5/2013 | Amit | G06F 21/52 |
| | | | 726/25 |
| 2014/0075561 A1 | 3/2014 | Guarnieri et al. | |
| 2014/0208200 A1* | 7/2014 | Powell | G06Q 30/0241 |
| | | | 715/234 |
| 2015/0154402 A1 | 6/2015 | Arbabi | |
| 2016/0142434 A1 | 5/2016 | Simpson | |

OTHER PUBLICATIONS

Tripp, O., et al., Hybrid Analysis for Javascript Security Assessment, IBM Rational Software, Feb. 1, 2010, 4 pages.

Tripp, O., et al., Hybrid Security Analysis of Web Javascript Code via Dynamic Partial Evaluation, IBM Watson Research Center, Jan. 25, 2014, 11 pages.

Vogt, P., et al., Cross-site Scripting Prevention with Dynamic Data Tainting and Static Analysis, Technical University Vienna, Nov. 20, 2006, 12 pages.

European Patent Office, Extended European Search Report for Appl. No. 17186045.5 dated Jan. 8, 2018 (5 pages).

* cited by examiner

US 10,637,881 B2

JAVASCRIPT SECURITY TESTING

CROSS REFERENCE TO RELATED APPLICATIONS

This application claims the benefit under 35 U.S.C. § 119(e) of U.S. Provisional Application Ser. No. 62/380,178, filed Aug. 26, 2016, which is hereby incorporated by reference.

BACKGROUND

Web pages/applications may be tested to ensure for sources of exploitable vulnerabilities. One source of these vulnerabilities may be executable JavaScript code. Because these applications are often large, complex and interconnected with web services, JavaScript analysis may be performed to expose attackable entry points.

BRIEF DESCRIPTION OF THE DRAWINGS

The following detailed description references the drawings, wherein.

DETAILED DESCRIPTION

The systems and methods for JavaScript security testing combine aspects of two different techniques for finding security vulnerabilities: static analysis and dynamic analysis. Static analysis may directly analyzes the source code itself. Dynamic analysis may execute the web page/application—as it is deployed—and may infer the presence of security holes by examining HTTP responses from targeted attacks (exploits). The combined approach discussed herein may allow for examination of the evolving document object model (DOM) states for client-side vulnerabilities, such as DOM based Cross Site Scripting (XSS). The systems and methods for JavaScript security testing may apply sets of custom rules to a given code base and these rules can be adapted to run in the hybrid DOM analyzer.

By creating a headless browser and JavaScript execution engine that runs within the dynamic analysis scanner, the bytecode generated from a dynamic webpage's script content may be packaged and sent off to static rules during the page's lifecycle of JavaScript execution. This enables analysis of the client-side source code (the initial state and the stream of transformed code states). The static rules may run on this bytecode that includes any dynamically created content inside an actual load of the web page. As used herein, web page and page may refer to any type of web content utilizing HTML, included web pages, web applications, etc. If any of the rules flag a data flow from this to be vulnerable to, the dynamic engine can continue to verify that the injection vector is also not filtered to protect against such an attack.

The hybrid approach discussed herein may reduce false-positives by detecting malicious, executable JavaScript that dynamically appears in the DOM due to user input. If the user input causes a DOM mutation that is executable, the hybrid analyzer may identify the DOM mutation as a vulnerability because the executable byte code is now part of the DOM and can be inspected.

An example method for JavaScript security testing may include receiving, by a processor, an initial document object model (DOM) corresponding to an HTML page structure including a plurality of executable JavaScript code and simulating, by the processor, a user interaction with an executable JavaScript code belonging to the plurality in the HTML page structure. The method may include adjusting, by the processor, the initial DOM based on the simulated user interaction, generating, by the processor, byte code corresponding to the adjust DOM and analyzing, by the processor, the byte code using a set of static rules.

Figure 1:
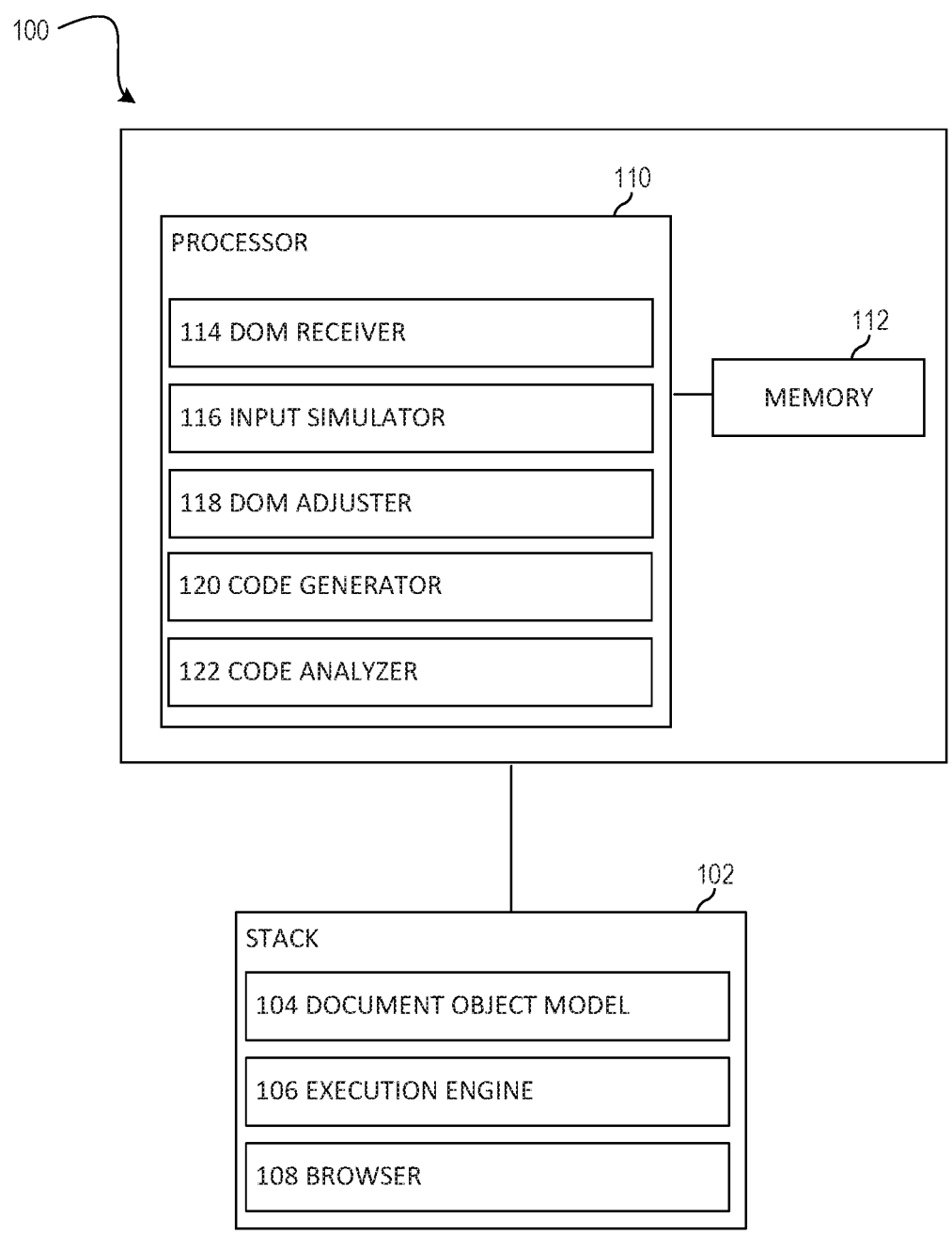
FIG. 1 is a block diagram of an example system for JavaScript security testing.

FIG. 1 is a block diagram of an example environment 100 in which JavaScript security testing may be useful. Environment 100 may include a stack 102 with a document object model 104, an execution engine 106 and a browser 108. A document object model (DOM) 104 is an internal representation of the Hyper Text Markup Language (HTML) page structure, i.e., it is a tree structure that mirrors the web page. The initial page may come from a web server and may be rendered into a browser as HTML and other code, such as JavaScript (JS) code, which may execute after the HTML page loads. Once rendered, the page may be interacted with (for example by clicks, keypresses, and timer events, etc.) causing the page to change. These interactions may cause changes the DOM to in the form of additional to the DOM, deletions from the DOM, alterations of the DOM, etc. These changes to the DOM may be referred to as "DOM mutations."

The execution engine 106 may execute the code from the HTML page structure. For example, execution engine 106 may be a JavaScript engine that executes JavaScript code. The browser 108 may be used to interpret the HTML page structure and executable code that is represented by the DOM 104. In some aspects, the browser may be a "headless" browser that emulates a human operator and also internally tracks DOM state changes. The headless browser may make calls to a server using the Asynchronous JavaScript and XML protocol (AJAX). The headless browser may emulate how a traditional browser acts but may not render a graphical user interface (GUI). By not rendering a GUI, system 100 may increase the speed of a security scan/analysis. The browser 108 may also have access to certain values and actions that are prohibited and/or hidden by a traditional browser.

System 100 may also include a processor 110 and a memory 112 that may be coupled to each other through a communication link (e.g., a bus). Processor 110 may include a Central Processing Unit (CPU) or another suitable hardware processor. In some examples, memory 112 stores machine readable instructions executed by processor 110. Memory 112 may include any suitable combination of volatile and/or non-volatile memory, such as combinations of Random Access Memory (RAM), Read-Only Memory (ROM), flash memory, and/or other suitable memory. Memory 112 may also include a random access non-volatile memory that can retain content when the power is off.

Memory 112 may store instructions to be executed by processor 110 including instructions for and/or other components. Furthermore, in FIG. 1 and other Figures described herein, different numbers of components or entities than depicted may be used.

Processor 110 may execute instructions of DOM receiver 114 to receive an initial document object model (DOM) corresponding to an HTML page structure. Processor 110 may execute instructions of input simulator 116 to simulate a user input on an element of the HTML page structure. User input simulator 116 may access the browser 108 to simulate the user input. The user input may correspond to executable code from the HTML page structure, such as JavaScript code.

Processor 110 may execute instructions of DOM adjuster 118 to adjust the initial DOM based on the simulated user input. For example, the browser 108 may be driven programmatically by a crawler process that consumes dynamically discovered URLs, HTML forms, AJAX call paths and any relevant security data revealed by performing an automated crawl. Each page of web content represents a resource that has executable JavaScript code and an HTML DOM. The full state-space of this DOM and JavaScript code may be revealed by emulating and triggering events that could have been activated by a user via mouse, keyboard, etc. The JavaScript interpreter and DOM tree may be implemented by the script engine so that full introspection of the running code and the associated page changes (DOM changes) can be recorded and fed into a security auditing layer.

The browser 108 may stimulate possible code execution paths. These execution paths may be explored in real-time or near real-time while emulating user interaction (typing, clicking, etc.), the browser (call chains, page transforms, etc.) and the resultant network traffic to the server.

Browser 108 may track state changes to the DOM by recording adjustments made to the DOM. This may include the adjustment to the initial DOM based on the simulated user interaction. In this manner, system 100 can perform hybrid analysis on the onload (initial) state of a page's lifecycle, as well as other states of the DOM after certain user interactions and code executions cause changes to the page. For example, once a page loads on a website there may be a plurality of areas that can be navigated to, creating a new page (such as, for example, clicking on a link). However, with Single Page Applications (SPAs), clicking on a link in these pages may not generate a new page but instead may dynamically request new content from the server and render it on the same page. Since DOM adjuster 118 accesses a live representation of the DOM available, DOM adjuster 118 may access the present state of the DOM and other possible state that can be reached during the state transitions caused by loading a new section of the site dynamically.

In other words, DOM adjuster 118 may have access to the page load, but can also crawl the internals of the page and transition back to whatever state we need allows us to perform static analysis at any possible level of a page. For example, DOM adjuster 118 may restore the initial DOM, adjust the initial DOM based on a different simulated user interaction and create a second adjusted DOM based on the adjustment.

Processor 110 may execute instructions of code generator 120 to generate byte code corresponding to the adjusted DOM. One example that may be used to illustrate system 100 is the example of a client-side vulnerability is DOM-based Cross Site Scripting (DOM XSS). Static taint analysis of the JavaScript may reveal attack vectors and exploit paths exposed by the client-side code. Dynamic scanners can instrument their crawling engines to explore the web page for unique JS/DOM combinations and can monitor resultant web traffic (AJAX calls) and use them as attack templates when executing the traditional dynamic auditing algorithms.

To find DOM XSS, the code generator 120 may trace user inputs. A page may contain information that is generated from user interaction, usually via the browser. User inputs are often emitted directly into the page and become part of the initial DOM and the mutated states that evolve as the user continues to interact with the page. Security holes may arise because the web page may—due to bad programming practices—incorporate user input directly into the DOM.

The execution engine 106 may receive the collected content from a page, and disassemble and execute the code until reaching a significant lifecycle event in the browser, such as the end of the load event. Once this occurs, all of the script that has executed until this point and all of the data in the DOM is then packaged into a state graph representation. Code generator 120 may create a state graph representation including the executed JavaScript code and data in the DOM.

The transformation into the state graph representation may produce a consumable format for the static analysis engines to read through the byte code as if it was the original source code, and also allows any dynamic content objects to be resolved. For example the code generator 120 may collect JavaScript code from the HTML page structure, convert the JavaScript code into an executable format and execute the JavaScript code until a lifecycle event is reached. The lifecycle event may be, for example, a page load event, a start of a load event, an end of the load event, etc.

The process for creating the state graph involves first taking all global functions and events run and then translating them into a model representing assignments, function calls, and various other actions that take place within execution. Code generator 120 may translate a plurality of global functions and events included in the state graph representation into a model.

Processor 110 may execute instructions of code analyzer 122 to analyze the byte code using a set of rules. Code analyzer 122 may use the initial list of functions (as discussed above in reference to code generator 120) to start executing as it did in regular script execution. This may also allow the rules to know how to propagate the data flow during a two part analysis. Code analyzer may determine a possible portion of the DOM where an assignment from a user interaction may be stored.

In the first phase of the analysis, code analyzer 122 may determine any possible "sources" for DOM XSS injection. This is any number of possible assignments from a user input into something stored in the DOM. If a rule pack flags a specific area as being a source, the information about the type of source, where it was in execution and how it was flagged may be transferred onto a tracked entity, and added to the overall list of possible sources of DOM XSS injection. With the completion of the first phase, there is a list of the complete amount of possible injectable sources. Code analyzer 122 may then determine if the data flows from any of these objects into an object that emits directly onto the DOM.

In the second phase of the analysis, code analyzer 122 may advance through each of the possible sources into the execution that follows it. This process may involve starting right after the source is set and then running the set of rules to determine whether the source is either transferred to another item in the DOM or matches to a "sink", which is an emission into the DOM itself. If the former applies, the taint flags that were present on the source may be transferred into the object and this new object may effectively also become a source. If a source or a transferred source then matches a sink rule inside of the model, a vulnerability is deemed as detected in the runtime JavaScript and is flagged.

In other words, code analyzer 122 may compare the possible portion to the set of static rules to determine that the possible source matches a sink and identify the source as a vulnerability. Code analyzer 122 may determine that the source is transferred to a second portion of the DOM and add the second portion to a list of potential portions of the DOM where an assignment from a user interaction may be stored.

After these two phases of execution, code analyzer 122 may have a list of vulnerable paths of exploitation of DOM XSS. Code analyzer 122 may return these items as vulnerabilities to the user, or may apply a value to each of the source objects that will execute JavaScript and continue running dynamic execution in the JavaScript engine to confirm. This process can remove the possibility of any such filtering being present that is not yet accounted for. Code analyzer 122 may transfer the source to a JavaScript engine, apply a value to the source and execute the source using the value on the JavaScript engine.

Figure 2:
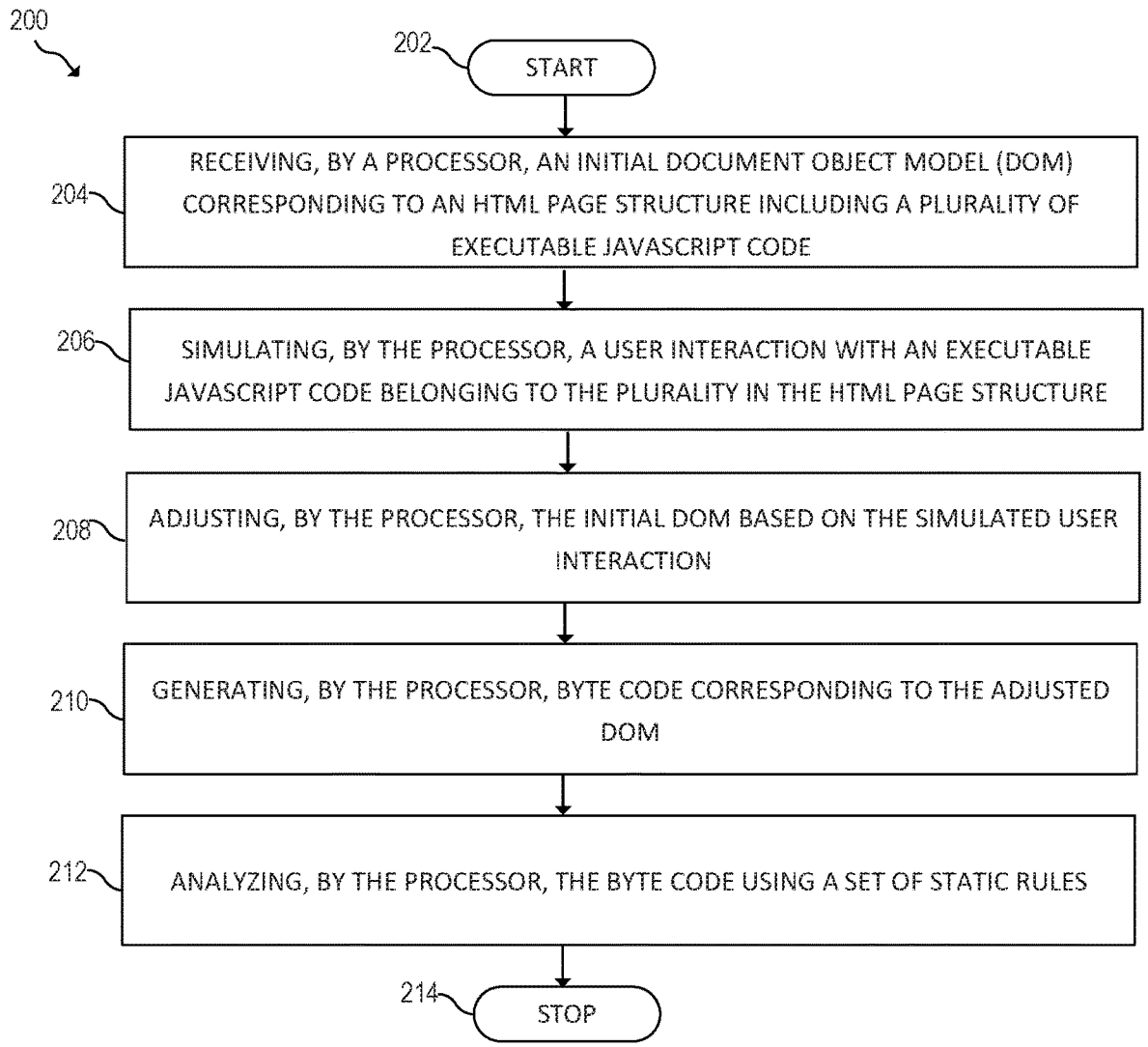
FIG. 2 is a flowchart of an example method for JavaScript security testing.

FIG. 2 is a flowchart of an example method 200 for JavaScript security analysis. Method 200 may be described below as being executed or performed by a system, for example, system 100 of FIG. 1 or system 400 of FIG. 4 described below. Other suitable systems and/or computing devices may be used as well. Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 200 may be implemented in the form of electronic circuitry (e.g., hardware). At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat.

Method 200 may start at block 202 and continue to block 204, where the method may include receiving, by a processor, an initial document object model (DOM) corresponding to an HTML page structure including a plurality of executable JavaScript code. Method 200 may continue to block 206, where the method may include simulating, by the processor, a user interaction with an executable JavaScript code belonging to the plurality in the HTML page structure. The simulation may be performed by a headless browser that emulates functionality of a browser without generating a graphic user interface.

At block 208, the method 200 may include adjusting, by the processor, the initial DOM based on the simulated user interaction. At block 210, the method 200 may include generating, by the processor, byte code corresponding to the adjusted DOM. Generating the byte code may include collecting JavaScript code from the HTML page structure, converting the JavaScript code into an executable format and executing the JavaScript code until a lifecycle event is reached. At block 212, the method 200 may include analyzing, by the processor, the byte code using a set of static rules. Method 200 may eventually continue to block 214, where method 200 may stop.

Figure 3A:
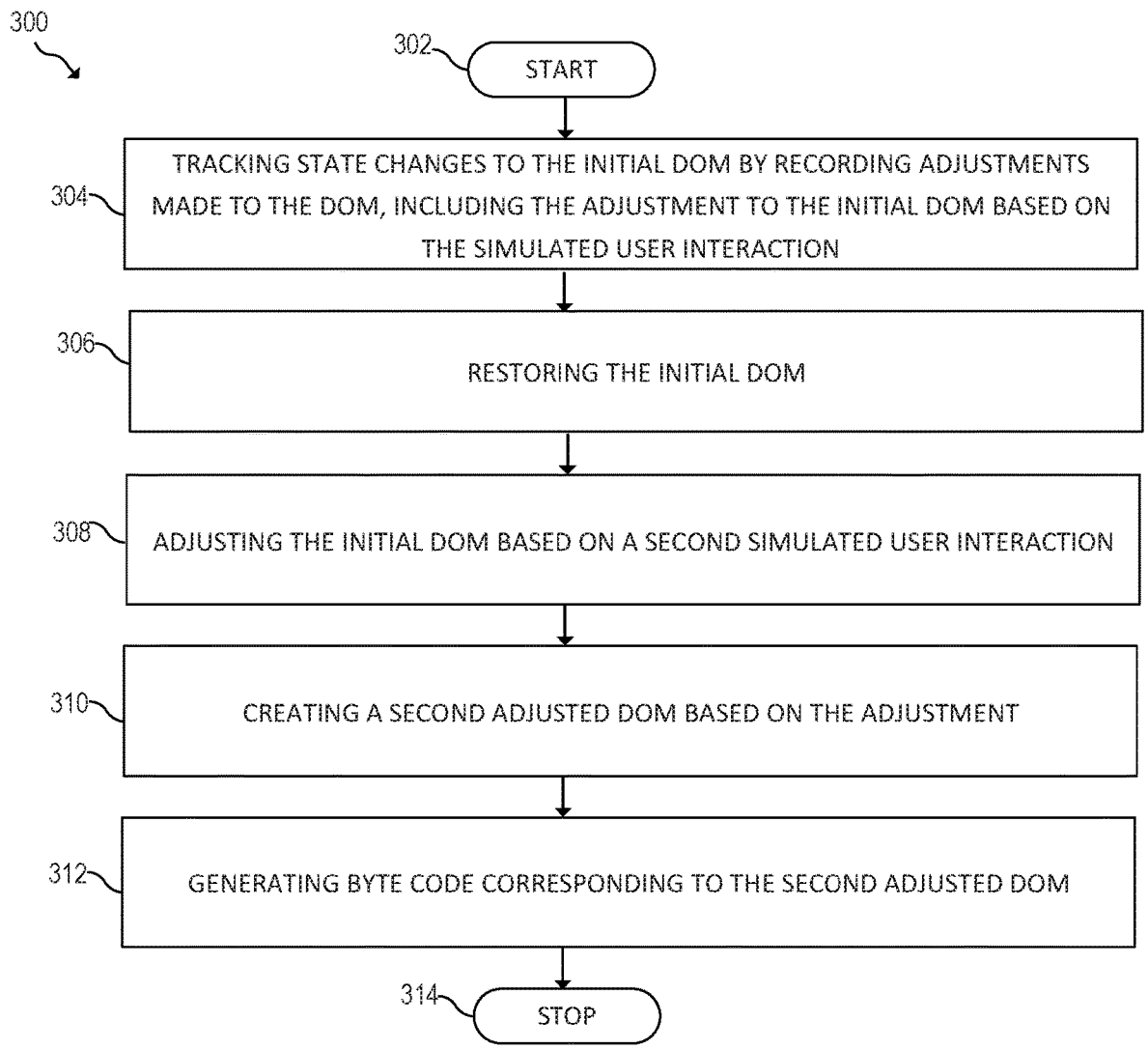
FIG. 3A is a flowchart of another example method for JavaScript security testing.

FIG. 3A is a flowchart of an example method 300 for JavaScript security analysis. Method 300 may be described below as being executed or performed by a system, for example, system 100 of FIG. 1 or system 400 of FIG. 4 described below. Other suitable systems and/or computing devices may be used as well. Method 300 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 300 may be implemented in the form of electronic circuitry (e.g., hardware). At least one block of method 300 may be executed substantially concurrently or in a different order than shown in FIG. 3A. Method 300 may include more or less blocks than are shown in FIG. 3A. Some of the blocks of method 300 may, at certain times, be ongoing and/or may repeat.

Method 300 may start at block 302 and continue to block 304, where the method 300 may include tracking state changes to the DOM by recording adjustments made to the DOM, including the adjustment to the initial DOM based on the simulated user interaction. Method 300 may continue to block 306, where the method 300 may include restoring the initial DOM. At block 308, the method 300 may include adjusting the initial DOM based on a second simulated user interaction. At block 310, the method 300 may include creating a second adjusted DOM based on the adjustment. At block 312, the method 300 may include generating byte code corresponding to the second adjusted DOM. Method 300 may eventually continue to block 314, where method 300 may stop.

Figure 3B:
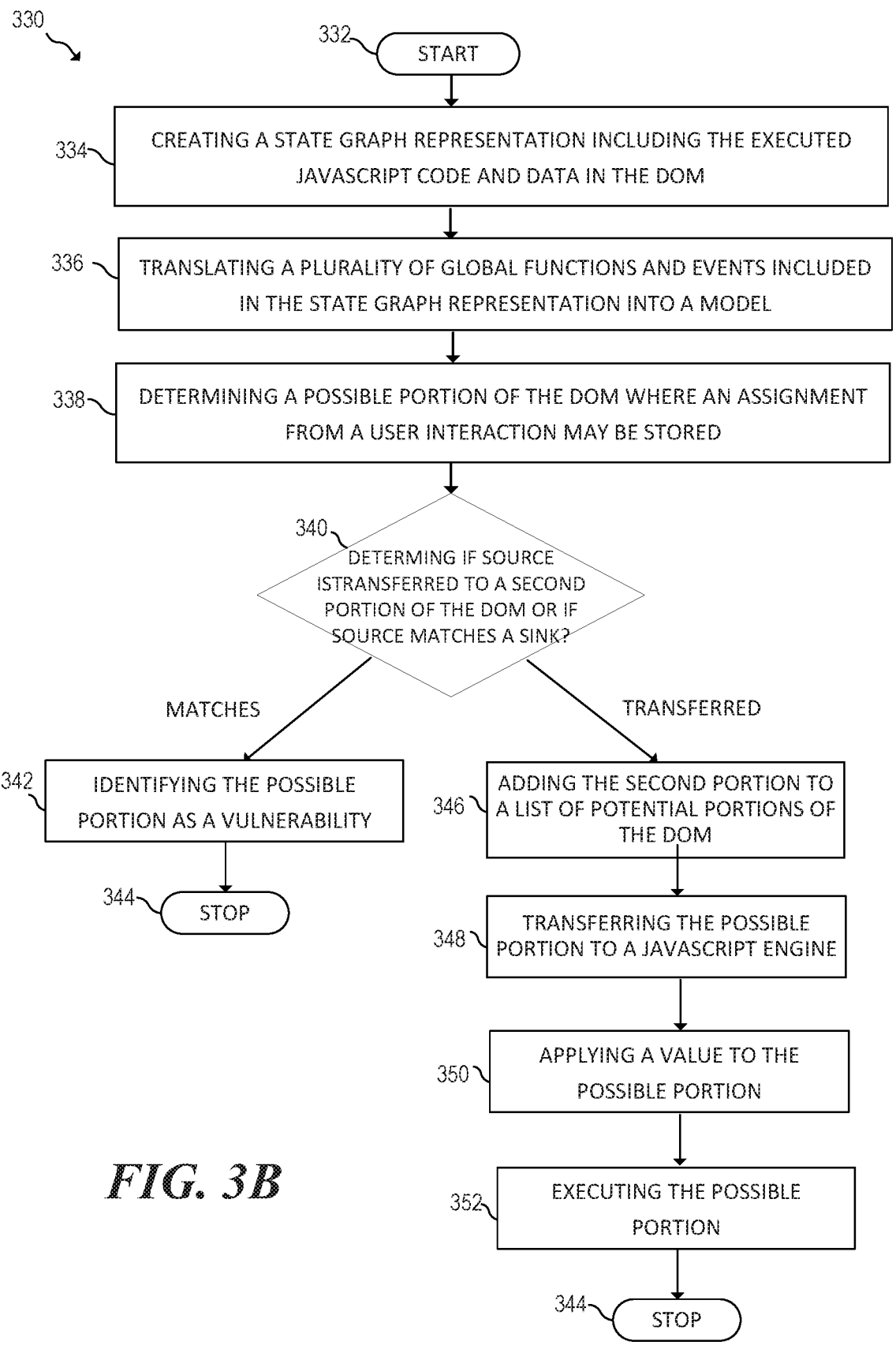
FIG. 3B is a flowchart of an example method for identifying vulnerabilities.

FIG. 3B is a flowchart of an example method 330 for identifying vulnerabilities. Method 330 may be described below as being executed or performed by a system, for example, system 100 of FIG. 1 or system 400 of FIG. 4 described below. Other suitable systems and/or computing devices may be used as well. Method 330 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 330 may be implemented in the form of electronic circuitry (e.g., hardware). At least one block of method 330 may be executed substantially concurrently or in a different order than shown in FIG. 3B. Method 330 may include more or less blocks than are shown in FIG. 3B. Some of the blocks of method 300 may, at certain times, be ongoing and/or may repeat.

Method 330 may start at block 332 and continue to block 334, where the method 330 may include creating a state graph representation including the executed JavaScript code and data in the DOM. Method 330 may continue to block 336, where the method 330 may include translating a plurality of global functions and events included in the state graph representation into a model. At block 338, the method 330 may include determining a possible portion of the DOM where an assignment from a user interaction may be stored. At block 340, the method 330 may include comparing the possible portion to the set of static rules to determine if the source is transferred to another DOM or if the source matches a sink. If it is determined that the possible portion matches a sink (MATCHES branch of block 340), at block 342, the method 330 may include identifying the possible portion as a vulnerability. Method 330 may eventually continue to block 344, where method 330 may stop.

If it is determined that the possible portion is transferred to a second portion of the DOM (TRANSFERRED branch of block 340), at block 346, the method 330 may include adding the second portion to a list of potential portions of the DOM where an assignment from a user interaction may be stored. At block 348, the method 330 may include transferring the possible portion to a JavaScript engine. At block 350, the method 330 may include applying a value to the possible portion and at block 352, the method may include executing the possible portion using the value on the JavaScript engine. Method 330 may eventually continue to block 344, where method 330 may stop.

Figure 4:
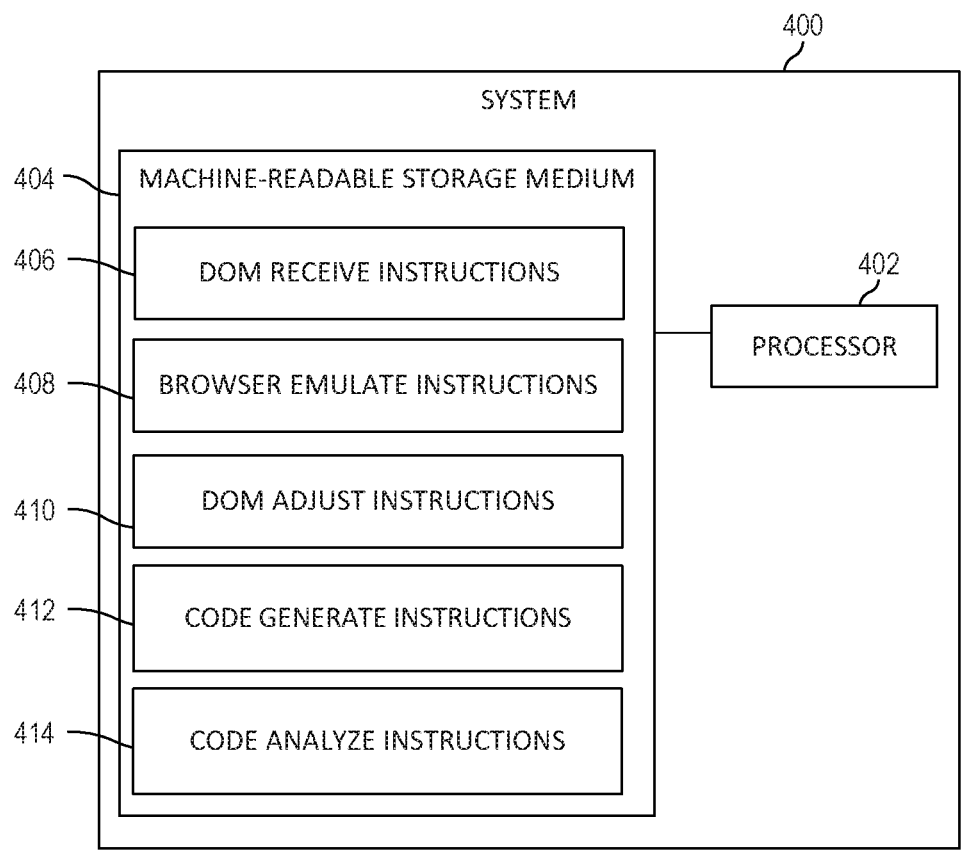
FIG. 4 is a block diagram of an example system for JavaScript security testing.

FIG. 4 is a block diagram of an example system 400 for JavaScript security analysis. System 400 may be similar to system 100 of FIG. 1, for example. In the example illustrated in FIG. 4, system 400 includes a processor 402 and a machine-readable storage medium 404. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408, 410, 412 and 414 to perform JavaScript security analysis. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, DOM receive instructions 406, when executed by a processor (e.g., 402), may cause system 400 to receive an initial document object model (DOM) corresponding to an HTML page structure including executable JavaScript code. Browser emulate instructions 408, when executed by a processor (e.g., 402), may cause system 400 to emulate a user interaction with the executable JavaScript code in a browser. The browser may be a headless browser that emulates functionality of a browser without generating a graphic user interface. DOM adjust instructions 410, when executed by a processor (e.g., 402), may cause system 400 to adjust the initial DOM based on the browser emulation. Code generate instructions 412, when executed by a processor (e.g., 402), may cause system 400 to generate byte code corresponding to the adjusted DOM. Code analyze instructions 414, when executed by a processor (e.g., 402), may cause system 400 to analyze the byte code using a set of static rules. Analyzing the byte code may include collecting JavaScript code from the HTML page structure, converting the JavaScript code into an executable format and executing the JavaScript code until a lifecycle event is reached.

The foregoing disclosure describes a number of examples for JavaScript security analysis. The disclosed examples may include systems, devices, computer-readable storage media, and methods for JavaScript security analysis. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method performed by a system comprising a hardware processor, comprising:
   receiving an initial document object model (DOM) corresponding to a HyperText Markup Language (HTML) page structure including a plurality of executable JavaScript code;
   simulating a user interaction with a first executable JavaScript code of the plurality of executable JavaScript code in the HTML page structure;
   tracking, using a browser in the system, state changes to the initial DOM by recording adjustments made to the initial DOM based on the simulated user interaction;
   adjusting, by DOM adjuster instructions in the system, the initial DOM based on the tracked state changes, to form an adjusted DOM;
   generating a first byte code corresponding to the adjusted DOM;
   analyzing the first byte code using a set of static rules;
   after forming the adjusted DOM, restoring, by the DOM adjuster instructions, the initial DOM;
   further adjusting, by the DOM adjuster instructions, the initial DOM based on a second simulated user interaction;
   creating a second adjusted DOM based on the further adjusting; and
   generating a second byte code corresponding to the second adjusted DOM.

2. The method of claim 1, wherein the browser is a headless browser, and wherein the simulating is performed by the headless browser that emulates functionality of a browser without generating a graphic user interface.

3. The method of claim 1, wherein the generating of the first byte code comprises:
   collecting JavaScript code from the HTML page structure;

converting the collected JavaScript code into an executable format; and executing the collected JavaScript code in the executable format until a lifecycle event is reached.

4. The method of claim 3, wherein the lifecycle event is a page load event.

5. The method of claim 1, comprising:
creating a state graph representation including the first executable JavaScript code and data in the initial DOM.

6. The method of claim 5, comprising:
translating a plurality of global functions and events included in the state graph representation into a model; and determining a first portion of the initial DOM where an assignment from a user interaction may be stored.

7. The method of claim 6, comprising:
comparing the first portion to the set of static rules to determine that the first portion matches a sink; and
identifying the first portion as a vulnerability.

8. The method of claim 6, comprising:
determining that the first portion is transferred to a second portion of the initial DOM; and
adding the second portion to a list of potential portions of the initial DOM where an assignment from a user interaction may be stored.

9. The method of claim 8, comprising:
transferring the first portion to a JavaScript engine;
applying a value to the first portion; and
executing the first portion using the value on the JavaScript engine.

10. A system comprising:
a processor; and
a non-transitory storage medium storing instructions executable on the processor to:
receive an initial document object model (DOM) corresponding to a HyperText Markup Language (HTML) page structure;
simulate a user input on an element of the HTML page structure;
track, using a browser in the system, state changes to the initial DOM by recording adjustments made to the initial DOM based on the simulated user input;
adjust, by DOM adjuster instructions in the system, the initial DOM based on the tracked state changes, to form an adjusted DOM;
generate a first byte code corresponding to the adjusted DOM;
analyze the first byte code using a set of rules;
after forming the adjusted DOM, restore the initial DOM;
further adjust the initial DOM based on a second simulated user input;
create a second adjusted DOM based on the further adjusting; and
generate a second byte code corresponding to the second adjusted DOM.

11. The system of claim 10, wherein the generating of the first byte code comprises:
collecting JavaScript code from the HTML page structure; and
converting the collected JavaScript code into an executable format, and wherein the instructions are executable on the processor to execute the collected JavaScript code in the executable format until a lifecycle event is reached.

12. A non-transitory machine-readable storage medium comprising instructions that upon execution cause a system to:
receive an initial document object model (DOM) corresponding to a HyperText Markup Language (HTML) page structure including executable JavaScript code;
simulate a user interaction with the executable JavaScript code in a browser;
track, using the browser, state changes to the initial DOM by recording adjustments made to the initial DOM based on the simulated user interaction;
adjust, by DOM adjuster instructions in the system, the initial DOM based on the tracked state changes, to form an adjusted DOM;
generate a first byte code corresponding to the adjusted DOM;
analyze the first byte code using a set of static rules;
after forming the adjusted DOM, restore the initial DOM;
further adjust the initial DOM based on a second simulated user interaction;
create a second adjusted DOM based on the further adjusting; and
generate a second byte code corresponding to the second adjusted DOM.

13. The non-transitory machine-readable storage medium of claim 12, wherein the instructions upon execution further cause the system to:
create a state graph representation including the executable JavaScript code and data in the initial DOM;
translate a plurality of global functions and events included in the state graph representation into a model; and
determine a first portion of the initial DOM where an assignment from a user interaction may be stored.

14. The non-transitory machine-readable storage medium of claim 13, wherein the instructions upon execution further cause the system to:
determine that the first portion is transferred to a second portion of the initial DOM; and
add the second portion to a list of potential portions of the initial DOM where an assignment from a user may be stored.

15. The non-transitory machine-readable storage medium of claim 13, wherein the instructions upon execution further cause the system to:
transfer the first portion to a JavaScript engine;
apply a value to the first portion; and
execute the first portion using the value at the JavaScript engine.

16. The system of claim 10, wherein the instructions are executable on the processor to:
identify a vulnerability of the HTML page structure based on the analyzing.

17. The non-transitory machine-readable storage medium of claim 12, wherein the instructions upon execution further cause the system to:
identify a vulnerability of the HTML page structure based on the analyzing.

* * * * *